No. 696,873. Patented Apr. 1, 1902.
D. H. LANGAN.
GRAB HOOK.
(Application filed Jan. 8, 1902.)

(No Model.)

Witnesses
O. M. Simpson
Jno. E. Parker

D. H. Langan Inventor
by C. A. Snow & Co.
Attorneys

THE NORRIS PETERS CO., PHOTO-LITHO., WASHINGTON, D. C.

UNITED STATES PATENT OFFICE.

DAVID H. LANGAN, OF GAINES, PENNSYLVANIA.

GRAB-HOOK.

SPECIFICATION forming part of Letters Patent No. 696,873, dated April 1, 1902.

Application filed January 8, 1902. Serial No. 88,918. (No model.)

*To all whom it may concern:*

Be it known that I, DAVID H. LANGAN, a citizen of the United States, residing at Gaines, in the county of Tioga and State of Pennsylvania, have invented a new and useful Grab-Hook, of which the following is a specification.

My invention relates to certain improvements in grab-hooks used for hauling or skidding logs, and has for its principal object to provide a hook of improved construction which may be readily withdrawn from the wood without danger of breakage and without damaging the extracting-tool.

Figure 1:
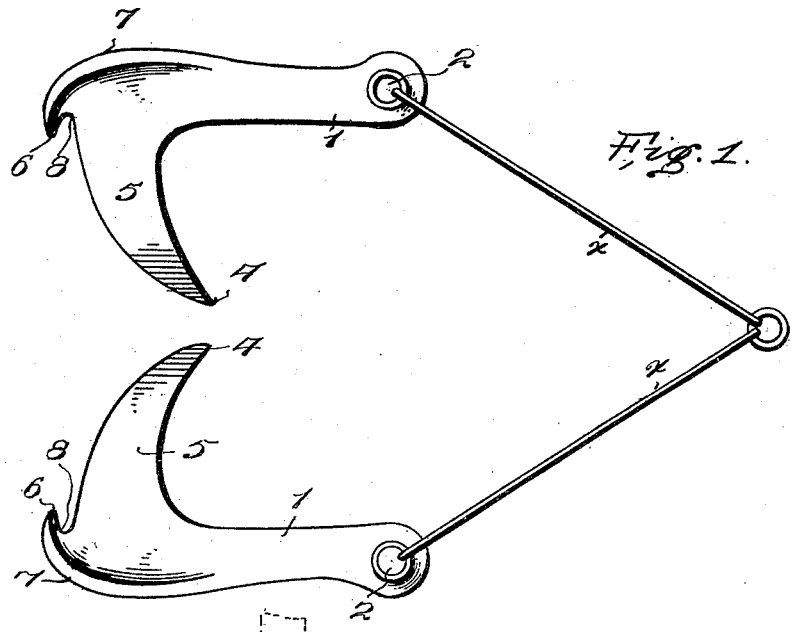
Figure 2:
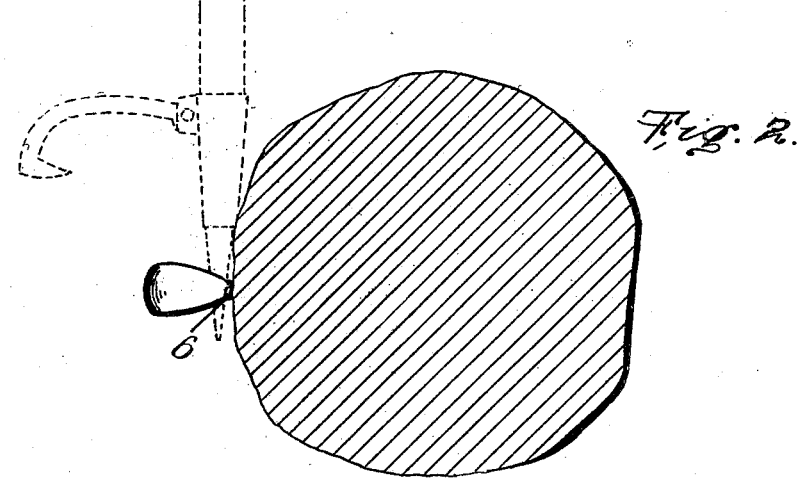
Figure 3:
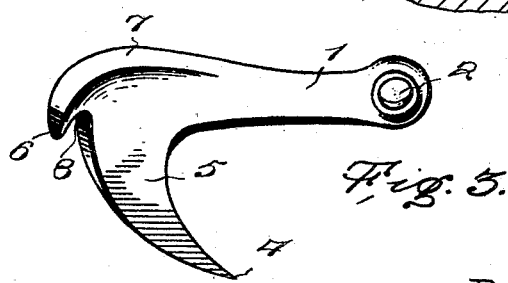

In the accompanying drawings, Figure 1 is a plan view of a pair of grab-hooks made in accordance with my invention and illustrating the relative positions of the hooks when attached to a log. Fig. 2 is an end elevation of one of the hooks, illustrating the method of extracting the same from the log and showing one form of tool which may be employed for the purpose. Fig. 3 is a detail perspective view of one of the hooks.

Similar numerals of reference are employed to indicate corresponding parts throughout the several views.

The shank portion 1 of the hook has a substantially straight shank portion provided at one end with an eye 2, to which may be attached any suitable draft device, the hooks being generally used in pairs, one on each side of the log, and connected by links, as $x$, to a suitable draft-chain. Near the rear portion of the shank is an inwardly-projecting tooth, having a sharpened point, as 4, and a gradually-widening blade, as 5, the edges of which are curved, as shown, in order that the pulling strain exerted on the draft device may cause the tooth to bite in the wood. The rear portion of the shank 1 is arranged on a curved line and terminates in a pointed shoulder 6 some little distance to the rear of the tooth, the point 6 being partly driven into the wood and in a measure serving as an auxiliary holding device. The rear face of the hook along the outer edge of the shank is provided with an enlarged rib 7, forming an impact-face for the mall generally used in driving the hook into the wood, this rib being continued rearwardly and merging into and forming part of the pointed shoulder 6 and materially strengthening this portion of the hook. Between the rear curved face of the tooth and the pointed shoulder 6 is a recess or depression 8, the bottom of which projects beyond the plane of the inner flat side of the shank, so that the hook cannot be driven into the wood to an extent sufficient to cause the wood or bark of the tree to entirely cover said recess, a sufficient opening being at all times left for the insertion of an extracting-tool.

In using the hook the tooth is driven into the wood until the shank is in contact with the edge of the log and the pointed shoulder 6 has slightly penetrated the bark or the wood. Generally a pair of hooks will be employed, one on each side of the log, and these may be connected to a suitable device or may be connected by chains or links to similar hooks in preceding or following logs to form a trail or train.

One of the principal disadvantages attendant on the use of all hooks of this class is the difficulty of effecting their withdrawal from the log, this being generally accomplished by the insertion of the spike of a pike-lever or cant-hook between the shank of the hook and the log, and it has also been proposed to form eyes in the hooks in order to permit of the insertion of a suitable tool. Where the extracting-tool is inserted between the shank and the log in advance of the tooth, the shank is raised and the tooth binds in the timber, it being not only difficult to effect the introduction of the tool between the shank and the log, but also extremely difficult to pry out the hook after the tool is inserted in position. Where an eye is employed, the structure is materially weakened if the eye formed be of a size sufficient to permit the introduction of an extracting-tool. If a small eye be formed, a suitable tool or one of sufficient strength cannot be inserted, and if so inserted the movement of the lever to an angular position, as against the log to form a fulcrum-point, will cause the binding of the tool in the eye and prevent the use of the log as a fulcrum for effecting the extraction of the tooth.

By the employment of the present invention it is found that the recess 8 being backed up by the widened flange may be made of a width sufficient to permit of the entrance of a pike or of any other ordinary tool, the log immediately forming the fulcrum and permitting the easy and ready extraction of the tooth. The curved shoulder 6 will, moreover, slightly bite into the bark or wood and will assist in retaining the hook in place. This construction, it is found, does not weaken the hook to the same extent as would the formation of an eye, and it may be made of a width much smaller than the diameter of eye necessary for the introduction and proper operation of a tool of similar size. In addition to this the log may be used as a fulcrum until the tooth is entirely removed, this operation being impossible where an eye is employed.

While the construction herein described, and illustrated in the accompanying drawings, represents the preferred form of hook, it is obvious that many changes in the form, size, and proportions may be made within the scope of the claims without departing from the spirit or sacrificing any of the advantages of my invention.

Having thus described my invention, what I claim is—

1. A grab-hook comprising a shank and toothed portion, the rear face of said shank being provided with a thickened or widened flange terminating at the rear of the tooth portion in a shoulder, there being a recess formed between the shoulder and the rear of the hook.

2. A grab-hook comprising a main shank and a toothed portion, there being a recess formed at the rear of the tooth and extending beyond the plane of the inner face of the shank.

3. A grab-hook having a shank 1 provided with a terminal eye 2, a hook 5, a shoulder 6 disposed to the rear of the hook and forming a continuation of the thickened flange at the outer rear wall thereof, there being an engaging recess for an extracting-tool formed between the shoulder and the rear face of the tooth, substantially as specified.

In testimony that I claim the foregoing as my own I have hereto affixed my signature in the presence of two witnesses.

DAVID H. LANGAN.

Witnesses:
JNO. G. STEELE,
JOHN E. DILLON.